United States Patent [19]
Thuen et al.

[11] Patent Number: 5,237,134
[45] Date of Patent: Aug. 17, 1993

[54] GAS DAMPED CRASH SENSOR

[75] Inventors: Torbjorn Thuen, Morris Plains; Harald S. Husby, Budd Lake; Allen K. Breed, Boonton Township, Morris County, all of N.J.

[73] Assignee: Breed Automotive Technology, Inc., Lakeland, Fla.

[21] Appl. No.: 635,764

[22] Filed: Dec. 28, 1990

Related U.S. Application Data

[63] Continuation-in-part of Ser. No. 447,108, Dec. 6, 1989, Pat. No. 5,031,931.

[51] Int. Cl.⁵ .............................. H01H 35/14
[52] U.S. Cl. ..................... 200/61.45 M; 200/61.53
[58] Field of Search ............... 200/61.45 R, 61.45 M, 200/61.53; 280/731, 734, 735

[56] References Cited

U.S. PATENT DOCUMENTS

| 4,900,880 | 2/1990 | Breed | 200/61.45 M |
| 5,031,931 | 7/1991 | Thuen et al. | 200/61.53 X |

Primary Examiner—J. R. Scott
Attorney, Agent, or Firm—Kane, Dalsimer, Sullivan, Kurucz, Levy, Eisele and Richard

[57] ABSTRACT

Conventional ball-in-tube, gas-damped, crash sensors utilize a gold plated ball to bridge two contacts. When the ball senses acceleration (deceleration) in the longitudinal direction of a cylinder of sufficient magnitude and duration, it moves to where it bridges the contacts, completing the electrical circuit and initiating deployment of a safety restraint system. A switch activated by magnetic flux is combined with this type of gas-damped sensor to provide a solid and reliable contact duration and ensure the correct functioning of the sensor. The level of biasing force for crash zone crash sensors of this type has been increased to avoid late firing problems on marginal crashes.

11 Claims, 4 Drawing Sheets

GAS DAMPED CRASH SENSOR

RELATED APPLICATION

This application is a continuation-in-part to application Ser. No. 447,108 filed Dec. 6, 1989, now U.S. Pat. No. 5,031,931.

BACKGROUND OF THE INVENTION

1. Field of Invention

This invention pertains to a sensor for mounting in motor vehicles for sensing a crash, said sensor generating a signal for deploying a passenger restraint system such as an air bag.

2. Description of the Prior Art

Air damped crash sensors have become widely adopted by many of the world's automobile manufacturers to sense that a crash is in progress and initiate the inflation of an air bag or tensioning of seat belts. These sensors are constructed from a ball and tube such as disclosed in U.S. Pat. Nos. 3,974,350; 4,198,864; 4,284,863; 4,329,549 and 4,573,706.

The ball-in-tube sensor currently in widespread use has a magnetic bias. Both ceramic and Alnico magnets are used depending on the amount of variation in bias force caused by temperature that can be tolerated. Sensors used in the crush zone of the vehicle and safing or arming sensors used both in the crush zone and out of the crush zone, use ceramic magnets since they can tolerate a wide variation in bias force. Alnico magnet are used for the higher biased non crush zone discriminating sensors where little variation in the bias can be tolerated. If a spring bias is used in place of the magnetic bias as shown in Thuen U.S. Pat. No. 4,580,810, the variation in the bias force with temperature can be practically eliminated.

In the conventional ball-in-tube sensor, two cantilevered contacts are bridged by the ball and both the ball and the contacts may be gold plated to minimize the contact resistance. If the sensing mass instead of bridging the contacts pushed one contact into another, the gold plating on the ball could be eliminated.

OBJECTIVES AND SUMMARY OF THE INVENTION

A crash sensor according to the invention is adapted for installation on an automotive vehicle equipped with a passenger protective device such as an inflatable air bag or seat belt tensioner. When such vehicle is subjected to deceleration of the kind accompanying a crash, the air bag is inflated to provide a protective cushion for the occupant or the seat belt is pulled back against the occupant holding him in a safe position.

A sensor constructed according to the invention comprises a housing adapted to be mounted on the vehicle in a position to sense and respond to deceleration pulses. Within the housing is a body containing a tubular passage in which is mounted a movable deceleration sensing mass. The mass is movable in response to a deceleration pulse above a threshold value from an initial position along a path leading to a normally open switch that is connected via suitable wiring to the operating mechanism of an inflatable air bag or seat belt tensioner.

A biasing spring or magnet acts on the deceleration sensing mass to bias the later to its initial position under a preselected force which must be exceeded before the sensing mass may move from its initial position. When the sensing mass is subjected to a deceleration creating an inertial force greater than the preselected biasing force it from its initial position toward its air bag or set belt tensioner operating position. Movement of the sensing mass is fluid damped thereby requiring a finite period of time for the sensing mass to move from its initial position to its operating position during which time the deceleration must continue to exceed the bias force.

According to another feature of the invention, it has been discovered that increasing the biasing force from 2 to 3 G's of the conventional gas damped sensors to approximately 6 G's can solve the late-firing problems present in the conventional sensors, without affecting the sensitivity of the sensor for other crashes. Preferably, the level of the biasing force for crush zone crash sensors is increased to greater than 5 G's and, more particularly, to the range of within 5–10 G's.

It is an objective of this invention to provide a contact design which eliminates contact bounce.

It is another objective of this invention to utilize the magnetic field which is present in a magnetically biased sensor to cause one contact to be held against a second contact when the sensor triggers.

It is another objective of this invention to utilize one contact as a biasing force against the ball which is pushed into a second more rigid contact thus eliminating both contact bounce and the magnet.

It is a further objective of this invention to devise a smaller, simpler and less expensive sensor.

Still another objective of this invention is to eliminate the need for gold plating on the sensing mass.

It is still another project of this invention to provide a level of higher biasing force than is previously known in damped crush zone sensors to eliminate the late firing problems of such crash sensors on marginal crashes.

Other objectives and advantages will become apparent from the description of the preferred embodiments below.

BRIEF DESCRIPTION OF THE DRAWINGS

Crash sensing apparatus constructed in accordance with the preferred embodiments of the invention is illustrated in the accompanying drawings, wherein.

DETAILED DESCRIPTION OF THE PREFERRED EMBODIMENTS

Figure 2:
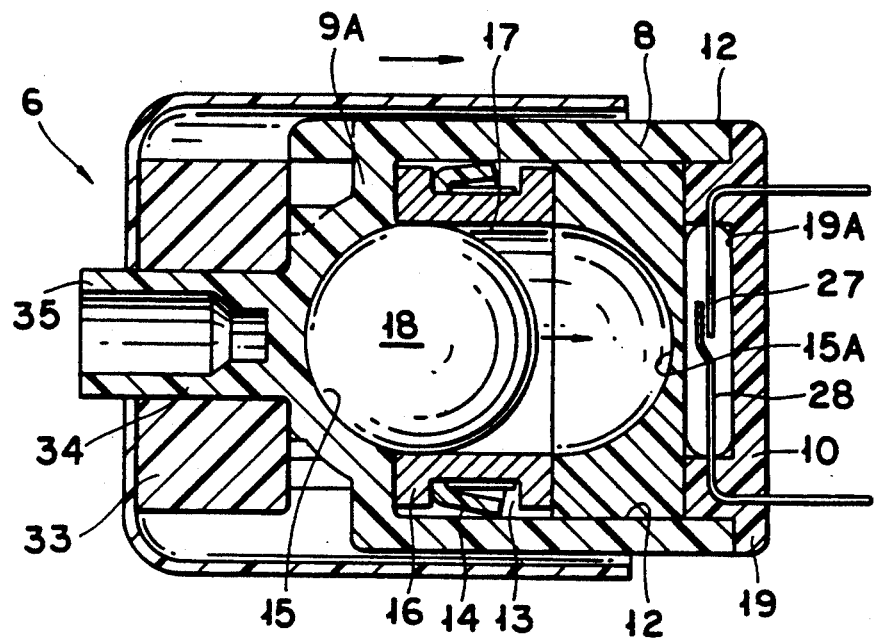
FIG. 2 is a sectional view of the apparatus in accordance with this invention for installation on an automotive vehicle.

An apparatus constructed in accordance with the invention is illustrated in FIG. 2 and is adapted for use in conjunction with an automotive vehicle or truck (not shown) preferably accommodated within a closed, metallic housing (not shown).

The sensor apparatus is designated generally by reference 6 in FIG. 2, and comprises a body 12 formed of suitable plastic material and having a cylindrical portion 8 closed at one end by a wall 9. At the other end of the body is a cylinder skirt 10. Within cylindrical portion 8 there is a bore 12. The inner surface of the portion 8 is provided with two opposed semi-spherical, concave seats 15, 15A. Fitted into the bore 12 is a metallic sleeve 16 having a smooth inner surface forming a linear passage 17 and on the outer diameter midway along the sleeve is groove 13 in which is accommodated a rubbery sealing and vibration isolating ring 14 which also holds the sleeve in place.

Accommodated within the passage 17 is a spherical, magnetically permeable, electrically conductive sensing mass 18, the radius of which corresponds substantially to that of the seats 15, 15A and the diameter of which is slightly less than that of the passage 17.

Fixed in the bore 12 is a cylindrical plug 19 formed of electrically insulating material, the plug being fixed in the chamber in any suitable manner, such as by cement, by ultrasonic welding, by crimping the rim of the skirt, or a combination thereof.

Plug 19 includes a reed switch 19A with two normally open contacts 27, 28.

Means are provided for applying magnetic biasing force on the mass 18 and comprises an annular magnet 33 having a hole 34 therethrough in which is received a mounting ferrule 35 forming a part of the body 8 and projecting beyond the wall 9.

Figure 1:
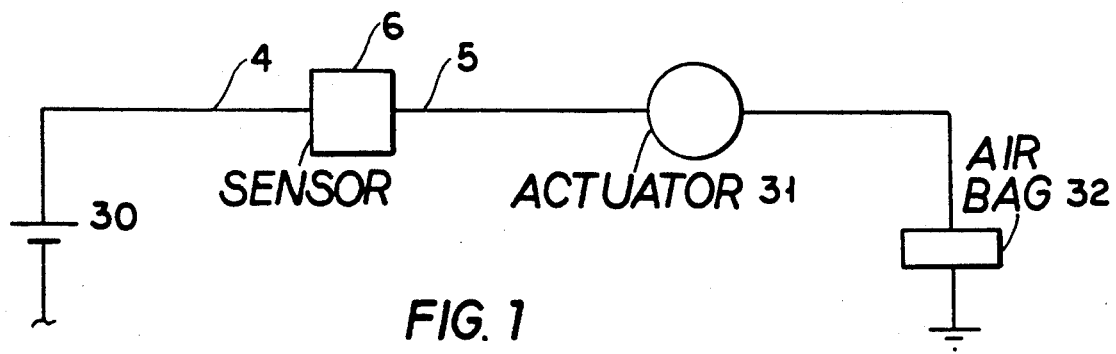
FIG. 1 shows a schematic diagram for a typical passenger restraint system.

To condition the apparatus for operation, the sensor mechanism is fitted into the housing and the latter is fixed to a vehicle with the longitudinal axis of the passage 17 parallel or at a predetermined angle to the longitudinal axis of the vehicle. As shown in FIG. 1, the conductors 4 and 5 coupled to contacts 27 and 28 respectively, then may be connected in circuit with the vehicle battery 30, activator 31, and the restraint device or air bag 32.

The magnet will exert a magnetically attractive force on the sensing mass 18 so as normally retain the latter in an initial, inactive position on the seat 15 at the closed end of the passage 17.

If the vehicle on which the sensor is mounted is traveling in the direction of the arrow A (FIG. 2) the sensing mass 18 will remain in its position until such time as the vehicle experiences a deceleration pulse greater than the biasing force exerted on the mass 18 by the magnet 33. If such deceleration pulse is of sufficient magnitude and duration, the sensing mass 18 will move from the position shown in FIG. 2 to an operating position, in which the mass causes contacts 27 and 28 to close and complete an electrical circuit rom the battery 30 to the activator 31 so as to activate the air bag 32.

Contacts 27 and 28 are made from a magnetically permeable materials such that in the presence of a magnetic field contacts 27 and 28 will bend toward each other closing the circuit as in conventional reed switches. When ball 18 moves to a position adjacent to contacts 27 and 28 the magnetic flux lines travel between the ball 18 and reed switch 19A of magnetic circuit element 40. This concentration of flux lines caused by the ball causes contacts 27 and 28 to bend toward each other making contact.

When the ball returns to the cylinder at the end of the crash, the concentration of flux lines is removed and contacts 27 and 28 spread apart.

This arrangement eliminates contact bounce since once the two contacts make contact the magnetic force holding them together exceeds the magnetic force needed to cause initial contact.

Figure 3:
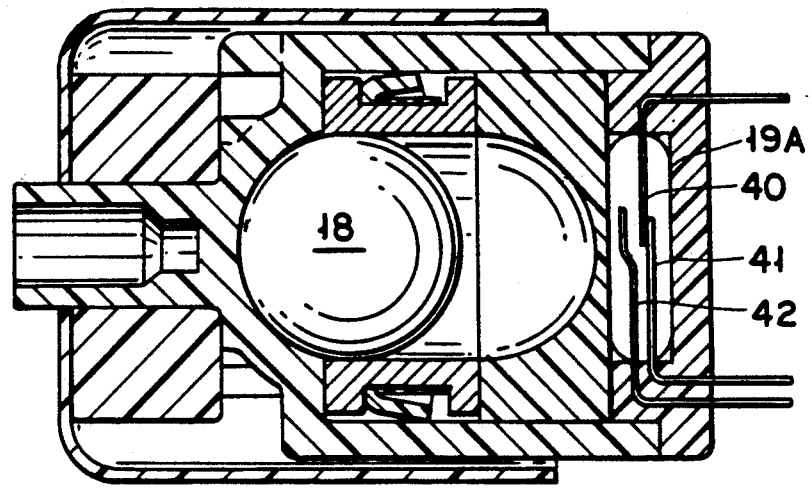
FIG. 3 represents an embodiment similar to the embodiment of FIG. 2 with an alternate configuration of the contacts.
Figure 4:
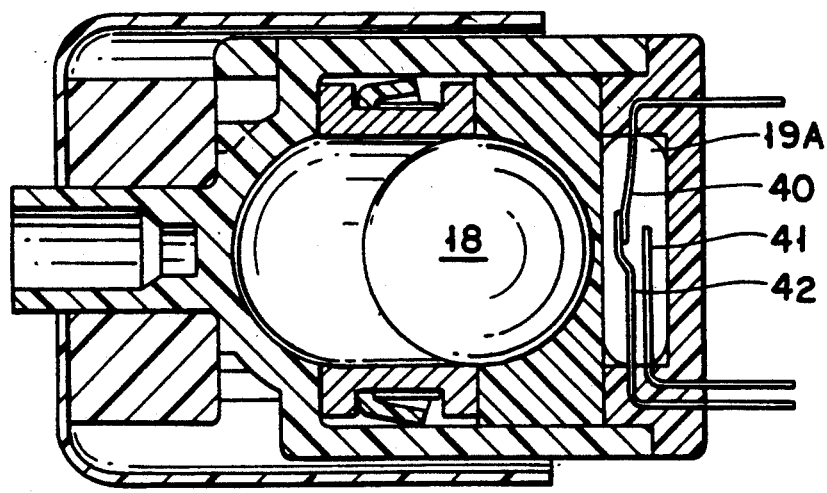
FIG. 4 shows the embodiment of FIG. 3 with the sensor activated.

FIG. 3 shows an alternate configuration herein reed switch 19A has been replaced by a reed switch 19B having three contacts 40, 41, 42 disposed in a standard single pole, double throw arrangement. When the sensor is inactive, ball 18 is biased to the right by magnet 33, and contact 40 touches contact 41. When ball 18 moves to the left under the effects of acceleration, contact 40 disengages from contact 41 and touches contact 42 as shown in FIG. 3.

Figure 5:
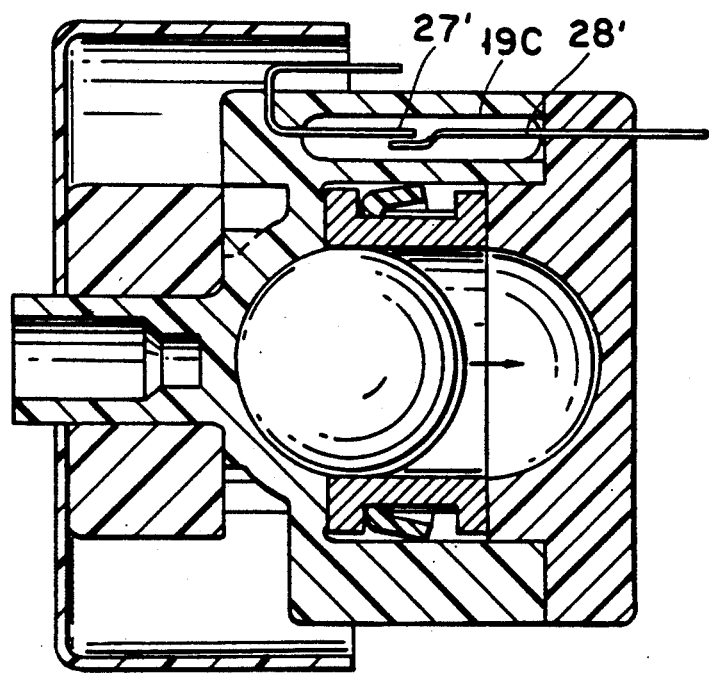
FIG. 5 represents an embodiment similar to the embodiment of FIG. 1 with an alternate position for the reed switch.

Although reed switch 19A shown in FIG. 2 is illustrated as being mounted in the sensor plug 19, an alternative approach would be to make use of a standard reed switch 19C imbedded in the body 8 as shown in FIG. 5. Contacts 27' and 28' of switch 19C perform in the same manner as contacts 27 and 28 in FIG. 2.

Figure 6:
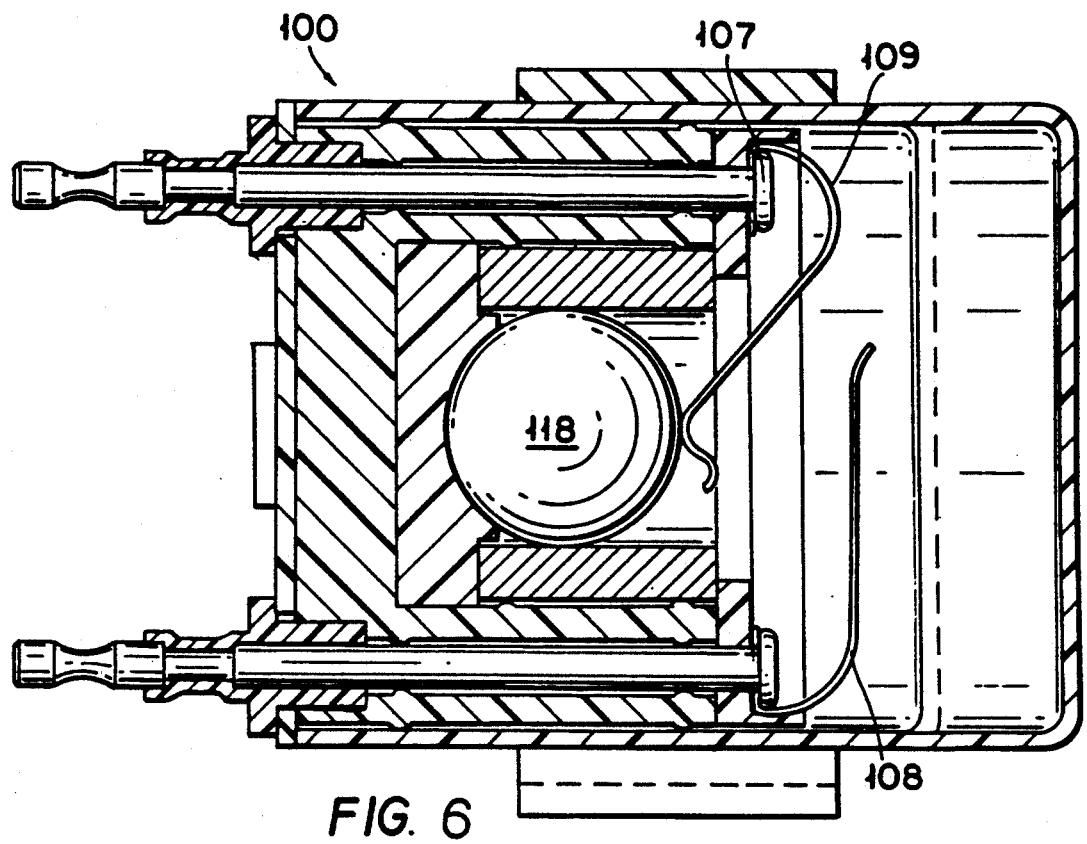
FIG. 6 shows a sectional view of another embodiment of the invention with spring-biasing.
Figure 7:
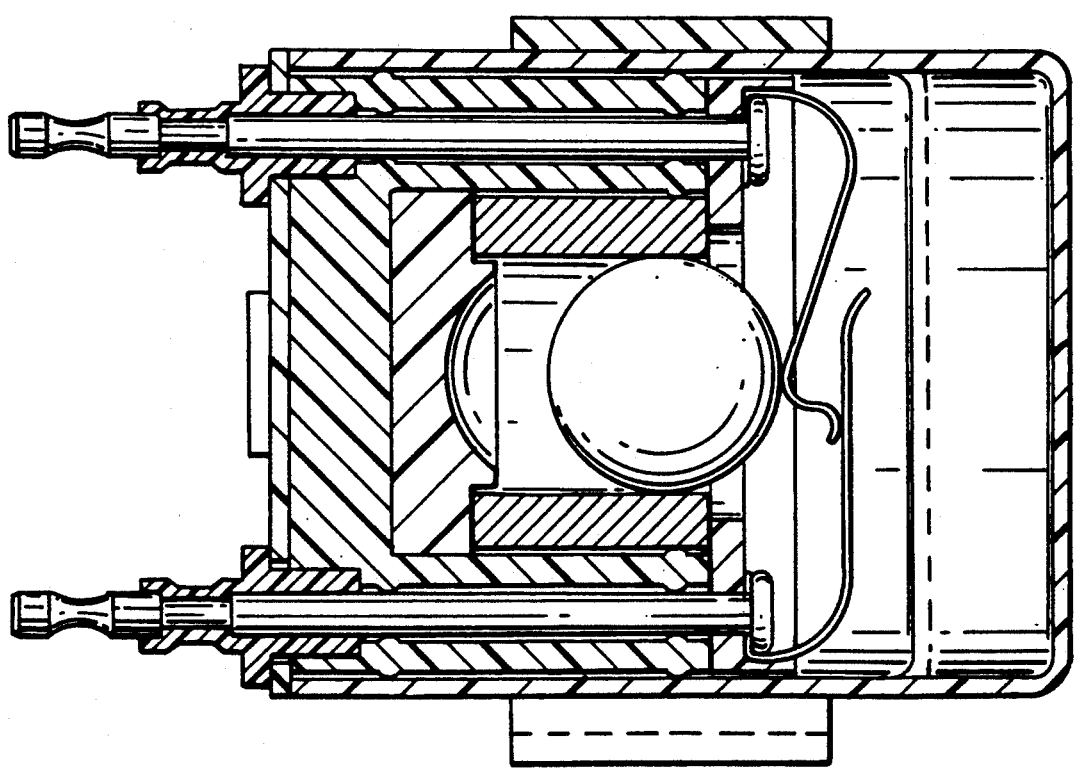
FIG. 7 is a view similar to FIG. 4, with the sensor activated.

An alternate embodiment of the sensor is shown in FIG. 6 generally as 100. Instead of a magnet and a reed switch contact 107 has a flexible extension 109 which presses on the ball providing the necessary bias. During a crash, the ball 118 moves toward the front of the vehicle to the right in FIG. 6, however its motion is opposed by the contact biasing force and a difference in pressure across the ball. This pressure differential is gradually relieved by the flow of the gas through the clearance between the ball and the cylinder. The force exerted by the extension 109 against the ball at all times exceeds the inertial forces caused by the vibrations acting on the contact. Thus, the contact 107 always remains touching the ball 118. If the crash is of sufficient severity, ball 118 move to the right sufficiently to cause contact 107 to touch contact 108 completing the electrical connection (as shown in FIG. 7) and initiating a restraint device in a manner similar to FIG. 2. Since contact 108 is rigid and contact 107 is pushed substantially against the ball neither contact will vibrate and thus solid contact closure results.

Figure 8:
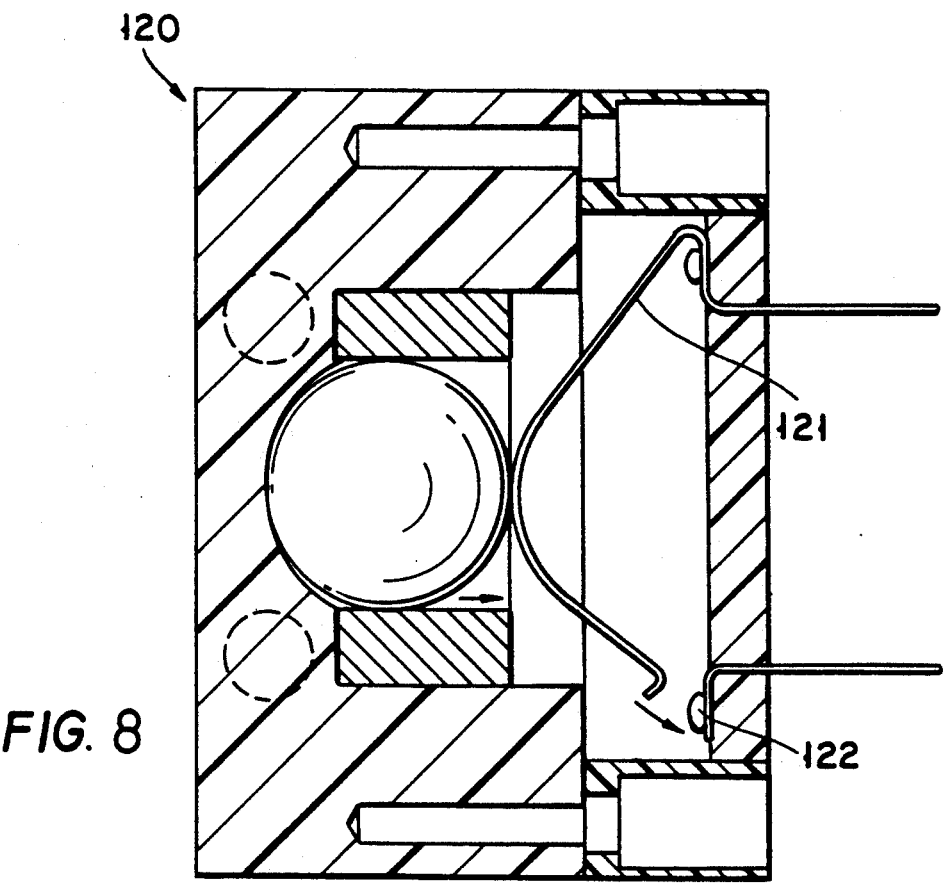
FIGS. 8 and 9 show other embodiments of a sensor with spring bias.
Figure 9:
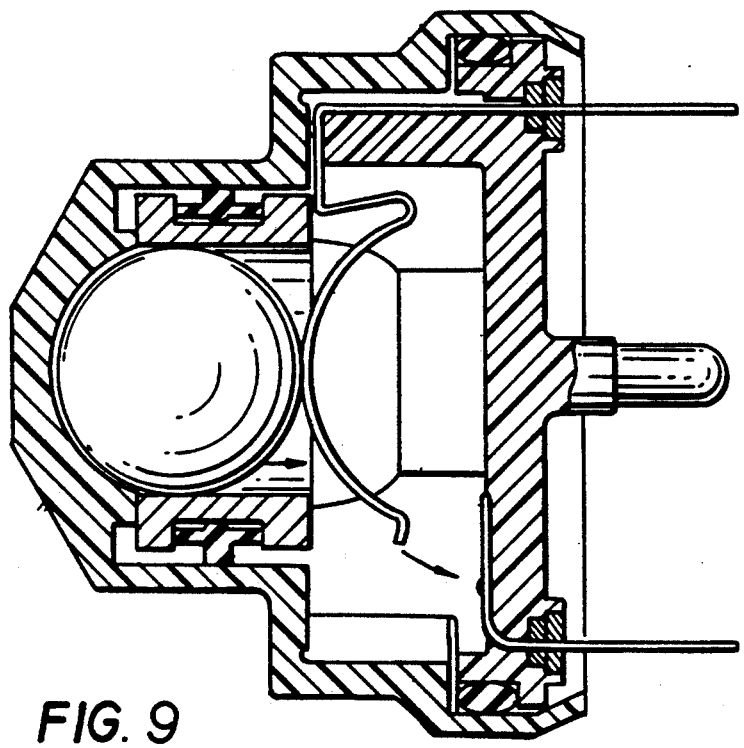

In FIG. 8, a sensor 120 is shown with a flexible contact 121 and a rigid contact 122. This sensor operates the same Way as the sensor of FIGS. 6, 7. FIG. 9 shows yet another arrangement for the flexible contact.

In the embodiments shown herein, the sensing mass is not part of the electric circuit. Therefore, the need for gold on the sensing mass can be eliminated resulting in a less expensive and more accurate sensor. In the embodiment shown in FIGS. 6-9, the need for the magnet is also eliminated resulting in a much smaller and simpler sensor. Also, since only a single contact is made instead of the bridging of two contacts in the conventional ball-in-tube sensor, the size of the sensing mass can be reduce further reducing the size and cost of the sensor.

Naturally, other types of sensors could make use of this invention for improved contact closures.

This invention is particularly useful when sensors are placed in the crush zone of the vehicle. The crush zone is that portion of the vehicle which undergoes significant plastic deformation during the accident and where both longitudinal and cross axis vibrations are of significant magnitude and can seriously effect the sensor behavior in marginal crashes.

Based on the study of a car crash library, it has been discovered that a standard crush zone sensor with a bias of 2-3 G's triggers late for a number of pulses between 12 and 16 MPH. A significant improvement can be made in a viscous damped sensor by increasing the bias to the range of within 5-10 G's to reduce the incidence of sensor triggering on long duration pulses which are indicative of the sensor not being in the crush zone.

If a sensor is allowed to fire later than about 30 milliseconds after the beginning of a crash pulse the resulting deployment of the occupant restraint system may cause harm to the occupant.

A gas-damped crash sensor with a 2.2 G bias can easily fire substantially later than 30 ms provided that a relatively mild crash pulse continues for this period. If the bias is increased to above 5 G's, the possibility of late firing is eliminated for all crashes except those which continue to be severe or for which the crash pulse continues due to a secondary collision. Bias levels above about 10 G's do not permit effective crash sensing even in the low (1-30 ms). However, the parameters of a sensor, such as the clearance between the sensing mass and the cylinder or the travel of the sensing mass, can be adjusted to obtain the required sensitivity when the bias level is changed. Thus, the several aforenoted objects and advantages are most effectively obtained. Although some somewhat preferred embodiments have been disclosed and described in detailed herein it should be understood that this invention is in no sense limited thereby and its scope is to be determined by that of the appended claims.

What is claimed is:

1. A crash sensor comprising:
   (a) a tubular passage;
   (b) a magnetically permeable sensing mass, arranged to move in said passage between a first location and a second location;
   (c) a magnet for biasing said sensing mass toward said first location in said passage;
   (d) first and second electrical contacts arranged to come in contact with each other when said sensing mass is moved to said second location, both said first and said second contacts being constructed of magnetically permeable material;
   (e) means for concentrating magnetic flux from said magnet through said first and second contacts in response to the presence of said sensing mass at said second location, such that said contacts are mutually attracted to each other and tend to remain in contact once closed as long as said flux is present.

2. The crash sensor in accordance with claim 1, wherein a tight clearance is provided between said sensing mass and said tubular passage, and wherein said passage is substantially closed at least at one end to the flow of fluid, thereby requiring fluid in said passage to pass through said tight clearance when said mass moves from said first location to said second location.

3. The crash sensor in accordance with claim 1, wherein said first and second contacts are enclosed in glass.

4. The crash sensor in accordance with claim 1, wherein said flux concentration means includes a magnetically permeable member to channel magnetic flux from said sensing mass at said second location in said passage to said first and second contacts.

5. The crash sensor in accordance with claim 1, wherein said sensing mass is a ball.

6. The crash sensor in accordance with claim 1, wherein said first and second contacts are normally open and in close proximity to each other, and wherein said flux concentrating means operates to close said first and second contacts when said sensing mass is moved to said second location.

7. A sensor for detecting a motor vehicle crash comprising:
   (a) a tubular passage;
   (b) a sensing mass arranged to move in said passage in response to a vehicle crash, there being a tight clearance between said sensing mass and said passage such that the movement of said sensing mass with respect to said passage is damped by gas flow;
   (c) a flexible first electrical contact;
   (d) a second more rigid electrical contact in proximity to said first contact;
   (e) means responsive to the movement of said sensing mass with respect to said passage for displacing said first contact toward said second contact causing said first and second contact to close an electrical circuit during a crash;
   (f) means for biasing said sensing mass so as to maintain said first and second contacts in open relationship in the absence of a vehicle crash.

8. The crash sensor in accordance with claim 7, wherein said first contact is normally in contact with said sensing mass and said biasing means includes said first contact.

9. The crash sensor in accordance with claim 7, wherein said sensing mass is a ball.

10. The crash sensor in accordance with claim 9, wherein the movement of said sensing mass with respect to said passage is damped by the gas flow through said tight clearance between said sensing mass and said passage.

11. The crash sensor in accordance with claim 7, wherein said means for biasing said sensing mass applies an average force in the range of 5 to 10 G's when said sensing mass is in any position within said passage.

* * * * *